Dec. 21, 1965    M. W. ARDERN    3,224,295
VARIABLE CONTROL MEANS
Filed July 26, 1963

INVENTOR.
MILTON W. ARDERN
BY
*Teare, Tetzer & Teare*
ATTORNEYS

United States Patent Office 3,224,295
Patented Dec. 21, 1965

3,224,295
VARIABLE CONTROL MEANS
Milton W. Ardern, 7363 Hillendale Road,
Chesterland, Ohio
Filed July 26, 1963, Ser. No. 297,831
9 Claims. (Cl. 74—568)

This invention relates in general to control means, and more particularly to control means for controlling the actuation of another control device, such as for instance a limit switch.

An example of the environmental use of the device of the invention is in the machine tool industry, wherein various functions of a machine tool, such as the speeds, the feed, the cross sliding, the indexing, etc. of for example an automatic screw machine, may be controlled automatically by control means, including switch operating studs or screws, as they are called in the trade, located on a movable or rotary control drum, and which studs or screws are adapted to engage limit switches or the like upon predetermined movement or rotation of the mounting drum, for actuating the limit switch and thus controlling an associated work operation of the machine tool.

Heretofore, such operating screws were generally selectively oriented on the control drum by the machine operator in setting up the job, and had to be so located both axially and circumferentially of the drum, that upon predetermined rotation of the drum, the operating screws, which project generally radially from the drum, engage a dog, or plunger, or other actuator on a limit switch, for actuating the latter, which in turn controls some machine function as required for the job set-up.

To change the job set-up generally required changing of most of the operating screws, and reorienting them in a manner for providing the desired sequence of the machine operations. This, of course, is time consuming and relatively expensive, and results in a comparatively large "down time" for a machine, especially when the job is changed relatively often.

The present invention provides an operating stud or screw control arrangement in which the operating stud proper is of a size adapted to clear the switch mechanism upon rotational movement of the carrier drum, but which can be quickly adapted for actuating engagement with such switch mechanism by the application of a cap or head portion to the operating screw proper, thus providing for quickly revising the control set-up.

Accordingly, an object of the invention is to provide a novel arrangement of control means for selective actuation of a control device.

Another object of the invention is to provide a switch operating stud or screw member in a machine tool environment which includes a detachable head, for changing the effective length of the operating member.

Another object of the invention is to provide in a machine tool, a rotatable indexing control drum having operating screws projecting generally radially therefrom with such operating screws being adapted for engagement with limit switches for actuating the latter, and wherein such operating screws embody detachable means for changing the effective length of the respective screw, and thus determining whether or not the operating screw will or will not engage the limit switch.

Another object of the invention is to provide an arrangement of the above described type wherein the means for changing the effective length of the operating screw comprises a plastic cap member, adapted for snap-fastening coaction with a head portion of the operating screw.

A still further object of the invention is to provide a switch operating screw arrangement for a machine tool wherein the operating screw can be selectively and quickly extended in length, and can be just as readily reduced in length, by means of an associated detachable cap or head member, and wherein such cap member includes means for detachably holding it in assembled relation with the operating screw proper, and also includes means for facilitating its application and/or removal from the operating screw proper.

Another object of the invention is to provide an arrangement of the above type wherein the means for detachably holding the cap on the head of the screw proper includes generally resilient walls on the cap with the latter having an interior circumferential groove adapted for receiving in snap-fastening holding relation a complementary shoulder on the screw proper, and wherein the exterior of the cap is serrated for facilitating its being gripped by the individual applying and/or removing the cap.

Other objects and advantages of the invention will be apparent from the following description taken in conjunction with the accompanying drawings, wherein.

Figure 1:
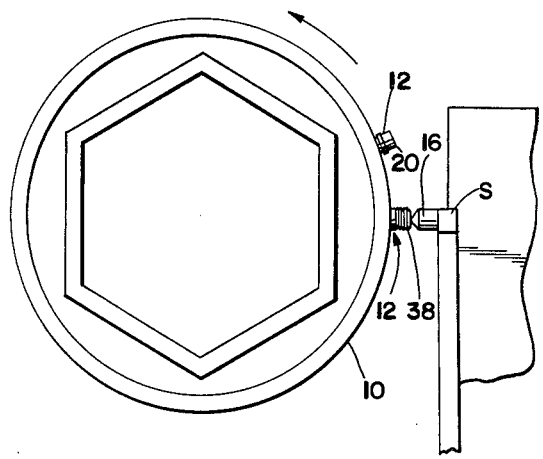
FIG. 1 is an end elevational, generally diagrammatic illustration of a machine tool embodying a control drum, and having switch operating screws of the invention projecting generally radially therefrom, with one of the screws being shown as engaging the actuator of an associated limits switch, for actuating the limit switch and thus controlling one of the work functions of the machine tool.
Figures 2, 3:
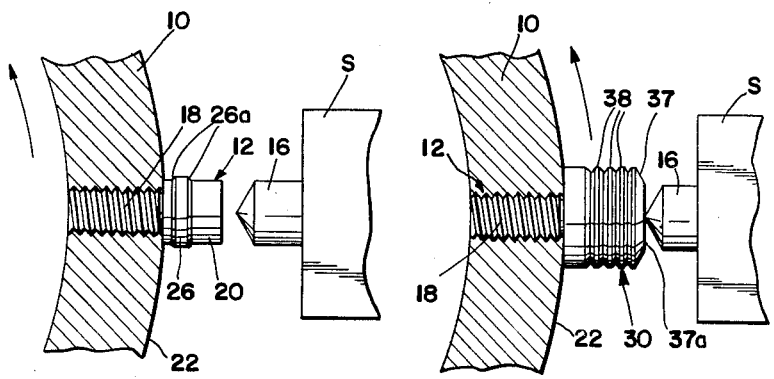
FIG. 2 is an enlarged, fragmentary, sectional view showing one of the switch operating screws of the invention as mounted on the control drum of FIG. 1, and wherein such operating screw is shown clearing the actuator of the associated limit switch upon rotation of the drum.
FIG. 3 is a sectional view generally similar to that of FIG. 2, except that the operating screw has embodied therewith one of the detachable cap members of the invention, whereby the cap member causes extension of the operating screw an amount sufficient for it to engage the actuator of the limit switch upon rotation of the drum, thus actuating the limit switch.
Figures 4, 5:
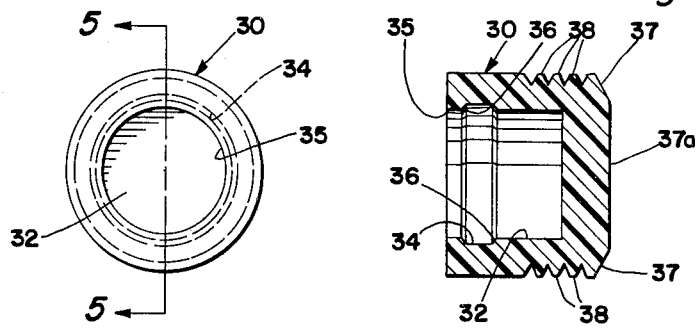
FIG. 4 is an enlarged end elevational view of the cap member shown in FIG. 3.
FIG. 5 is a sectional view taken generally along the plane of line 5—5 of FIG. 4, looking in the direction of the arrows.

Referring again to the drawings, and in particular to FIG. 1 thereof, there is shown diagrammatically an indexing control drum 10 of, for instance, a tool-holding turret type of machine tool, and wherein such control drum 10 has operating studs or screws 12 mounted thereon, and projecting generally radially therefrom, with the operating screws being adapted for engagement with actuators, such as for instance the spring loaded plunger 16 of a limit switch S, upon rotation of the control drum, for controlling a work function of the machine tool, such as for instance indexing of the tool mounting turret thereof. As can be best seen in FIGS. 2 and 3, the operating screws 12 may comprise a shank portion 18 which is threaded, and a head portion 20, with the shank portion being received in mounted and secured relation on the drum 10. The head portion 20 of the operating screw, which is of cylindrical configuration in the embodiment illustrated, projects generally radially outwardly from the exterior surface 22 of drum 10, and is of such axial length that it will clear the actuator 16 of the associated limit switch, upon rotation of the drum, and as shown for instance in FIG. 2.

The head portion 20 has a preferably circumferentially extending shoulder 26 thereon for a purpose to be hereinafter described, with such shoulder having sloping cam portions or surfaces 26a.

A cap member 30, which may be formed of any suitable material, but which is preferably formed of a plastic material, such as for instance nylon, is provided for removable mounting on the head 20 of the operating screw, and for extending the effective length of said head, such that the cap 30 will engage the actuator 16 of the limit switch upon rotation of the drum.

The cap 30 comprises a cavity 32 therein, with such cavity having a groove 34 extending circumferentially interiorly of the cavity, and generally adjacent the entrance 35 of the cavity, with such groove being defined in part by sloping surfaces 36 formed generally complementary to the aforementioned sloping surfaces 26a on the head 20 of the operating screw. The exterior of the cap at an end thereof is provided with circumferentially extending sloping cam surface 37 merging into flat surface 37a, which is adapted for camming coaction with the actuator or plunger 16 of the limit switch upon rotation of drum 10. The exterior wall of the cap 30 is also preferably provided with a plurality of circumferentially extending serrations 38, which are adapted for gripping by the workman when applying the cap to or removing the cap from the switch operating screw, and thus facilitating the application and/or removal of the cap to and from the screw.

When the cap is applied to the head 20 of the operating screw, the shoulder 26 on the head 20 is adapted to enter the groove 34 in the cap 30, and to coact with such groove in holding the cap in assembled relationship with the operating screw. It will be understood that the walls of the cap have sufficient resiliency so that cap 30 can be pushed or inserted on the head 20 of the operating screw in a snap-fastening action, and the shoulder 26 aided by the cam surfaces 26a thereon is enabled to enter the groove 34. Removal of the cap 30 from the operating screw is accomplished by reversing the aforedescribed procedure, and here again the sloping surfaces 26a on the head 20 and the corresponding surfaces 36 defining the groove 34 in the cap, aid in removal of the cap from the operating screw. Upon removal of the cap from the screw, it will be seen that the effective length of the screw has been diminished, and therefore once again the screw proper clears the actuator 16 of an associated limit switch. It will be understood therefore that the operating screws can be quickly activated and deactivated so far as operating the limit switches are concerned, in the setting up of the machine for different work operations and in different sequential relationships.

From the foregoing description and accompanying drawings, it will be seen that the invention provides a novel control arrangement for facilitating the actuation of other control means, and an arrangement which can be quickly acivated and deactivated for effective changing of the control arrangement.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a machine tool comprising a rotatable control drum, a plurality of spaced operating stud means projecting generally radially from the exterior surface of said drum, each of said stud means projecting a predetermined distance from said drum, plunger actuated limit switch means mounted adjacent said drum, said distance being of such extent that said stud means normally clears said switch means upon predetermined rotation of said drum, each of said stud means including a shank portion mounting the respective stud means on said drum and a head portion projecting radially outwardly from said surface of said drum, said head portion being of cylindrical configuration and including a circumferentially extending shoulder thereon, and a detachable plastic cap mounted on said head portion of certain of said stud means, said plastic cap comprising a chamber which receives said head portion therein, said chamber having a circumferentially extending groove therein receiving said shoulder and detachably interlocking said cap to said head portion, said cap operating to extend the effective length of the respective stud means radially outwardly a sufficient amount to obtain actuating engagement between the cap and the limit switch means, while the other of said stud means continue to clear said switch means, up said predetermined rotation of the drum.

2. In a machine tool in accordance with claim 1, wherein said groove in said cap is disposed adjacent the entranceway of said chamber in said cap.

3. In a machine tool in accordance with claim 1, sloping cam surfaces in said groove in said cap and corresponding sloping cam surfaces on said shoulder on said head portion, for facilitating the application of and removal of the cap to and from said stud means.

4. In a machine tool comprising, a generally rigid, rotatable control member, operating means mounted on said member and projecting therefrom, said means projecting a predetermined distance from said member, said distance being of such extent that such means normally clears associated actuatable means upon rotation of said member, and means detachably connected in snap-fastened relation to the first mentioned means for extending said first mentioned means a sufficient amount for causing engagement of the latter with the associated actuatable means upon predetermined rotary movement of said member, said operating means comprising a stud-like member projecting rigidly from said control member, said stud-like member having an enlarged head portion extending from the exterior surface of said control member, a shoulder projecting generally radially from said head portion, and cam means on said shoulder for facilitating movement of said detachable means into snap-fastened relation with said head portion.

5. A machine tool in accordance with claim 4, wherein said detachable means comprises a cap of plastic material, and embodies means on the exterior thereof for facilitating its assembly with and removal from said stud member.

6. In a machine tool comprising, a movable control member, operating means on said member projecting therefrom, said means projecting a predetermined distance from said member, said distance being of such extent that said means normally clears associated actuatable means upon movement of said member, means detachably connected to the first mentioned means for extending said first mentioned means a sufficient amount for causing actuating engagement of the latter with the associated actuatable means upon predetermined movement of said member, said operating means comprising a stud-like member projecting from said control member, said detachable means comprising a cap mounted on said stud-like member in snap-fastened relation, said cap being of plastic material and embodying means on the exterior thereof for facilitating its assembly with and removal from said stud-like member, said stud-like member including an enlarged head portion mounting said cap thereon, a shoulder projecting generally radially from said head portion for releasably holding said cap on said stud-like member during movement of said control member, and cam means on said shoulder for facilitating movement of said cap into snap-fastened relation with said head portion.

7. In a machine tool comprising a rotatable generally rigid control member, a plurality of operating means mounted on said member and projecting therefrom, said means projecting a predetermined distance from said member, said distance being of such extent that said means normally clears associated actuatable means upon rotation of said member, means detachably connected to certain of the first mentioned means for extending said certain first mentioned means a sufficient amount for causing actuating engagement of the latter with the associated actuatable means, while the other of said first mentioned means continue to clear the associated actuatable means, upon predetermined rotary movement of said control member, each of said operating means comprising a stud-like member, said stud-like member including an enlarged head portion extending from the exterior surface of said control member, a shoulder projecting generally radially from said head portion, said detachable means comprising a cap mounted on said head portion in snap-fastened relation, said shoulder coacting with said cap to releasably hold said cap on said stud-like member during rotary movement of said control member, and cam means on said shoulder for facilitating movement of said cap into snap-fastened mounted relation with said head portion.

8. An operating member adapted for mounting on a rotatable control member for use in actuating another control member in a machine tool, said operating member comprising a generally rigid elongated article having means adjacent one end thereof for mounting the article on the rotatable control member, said article adjacent the other end thereof having an enlarged head portion, said head portion being adapted for generally seating relationship with the rotatable control member, a shoulder projecting generally radially from said head portion, said head portion and said shoulder being adapted to be received interiorly of a cap in snap-fastened interlocking coaction therewith, for extending the effective length of said article, said shoulder having cam means thereon for facilitating movement of said cap into snap-fastened mounted relation with said head portion, and cam means on said shoulder for facilitating removal of the cap from said head portion.

9. In combination, an operating member adapted for mounting on a rotatable control member for use in actuating another control member in a machine tool, and a cap mounted in snap-fastened interlocking coaction on said operating member for extending the effective length thereof, said operating member comprising a generally rigid elongated article having means adjacent one end thereof for mounting the article on the rotatable control member, said article adjacent the other end thereof having an enlarged head portion, said head portion being adapted for generally seating relation with the rotatable control member, a shoulder projecting generally radially from said head portion, said cap having a chamber therein opening on one end thereof to the exterior of said cap, the interior of said chamber having an endless groove running circumferentially of said chamber with said groove being disposed adjacent the entranceway to said chamber, said head portion and said shoulder being received interiorly of said chamber in said cap in snap-fastened interlocking coaction therewith with said shoulder being received in said groove, said shoulder having cam means thereon for facilitating movement of said cap into said snap-fastened mounted relation with said head portion, and cam means on said shoulder for facilitating removal of said cap from said head portion, said cap being of generally cylindrical exterior configuration and including circumferentially extending serrations on the exterior thereof for facilitating the cap's application and removal from said article.

References Cited by the Examiner
UNITED STATES PATENTS

| | | | |
|---|---|---|---|
| 398,623 | 2/1889 | Keeton | 74—568 X |
| 1,737,598 | 12/1929 | Lombardi | 139—333 X |
| 2,418,757 | 4/1947 | Collins | 74—568 |
| 2,665,945 | 1/1954 | Barton | 215—41 X |
| 2,790,576 | 4/1957 | Lawrence | 215—41 X |
| 2,917,591 | 12/1959 | Juhas | 200—38 |

FOREIGN PATENTS 532,906   2/1941   Great Britain.

MILTON KAUFMAN, *Primary Examiner.*